Feb. 24, 1925.

J. McC. DIVINE

BALANCE

Filed July 7, 1922

1,527,788

Inventor
John M. Divine

By *[signature]*

Attorney

Patented Feb. 24, 1925.

1,527,788

UNITED STATES PATENT OFFICE.

JOHN McCALLIE DIVINE, OF CHATTANOOGA, TENNESSEE, ASSIGNOR OF ONE-THIRD TO JOHN B. WELCH, ONE-THIRD TO D. V. DIERKS, AND ONE-THIRD TO FREDERICK H. DIERKS, ALL OF CHATTANOOGA, TENNESSEE.

BALANCE.

Application filed July 7, 1922. Serial No. 573,330.

*To all whom it may concern:*

Be it known that I, JOHN M. DIVINE, a citizen of the United States, residing at Chattanooga, in the county of Hamilton and State of Tennessee, have invented certain new and useful Improvements in Balances, of which the following is a specification.

My invention consists in an improved construction of balances or measuring instruments for determining the moisture content of lumber, or similar substances, the object being to provide such a device by which the operator will be enabled to readily read from a scale comprised in the device the per cent of moisture removed from a test piece, all as will be hereinafter more fully described and claimed.

Figure 1:
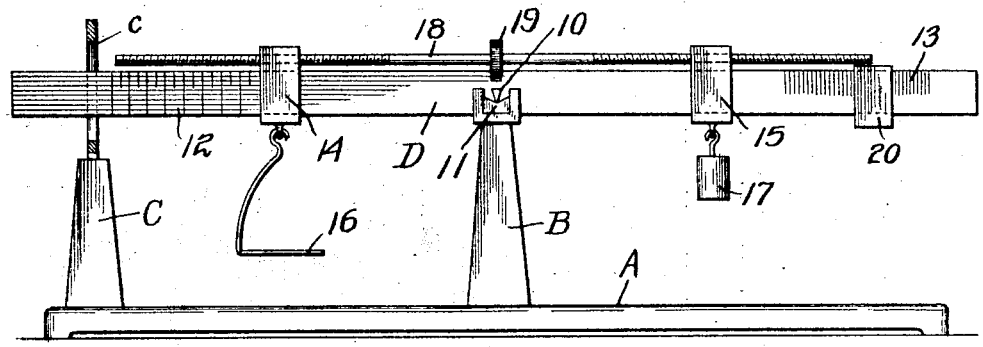
Figure 2:
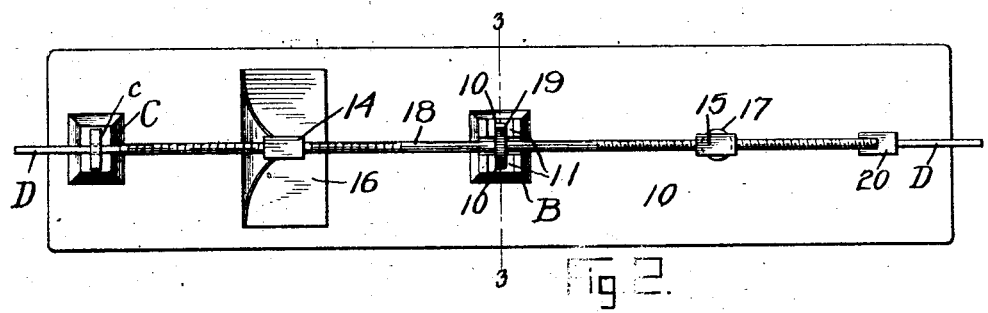
Figure 3:
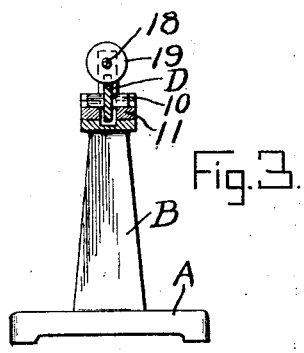
Figure 4:
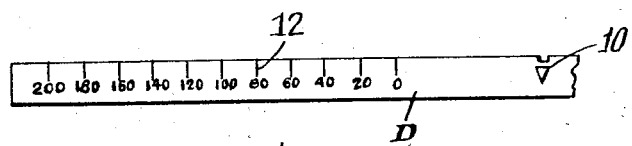

Referring to the accompanying drawings, which are made a part hereof and on which similar reference characters indicate similar parts, Figure 1 is a side elevation of a measuring instrument or balance of my improved construction, Figure 2 a top or plan view thereof, Figure 3 a cross section on the dotted line 3—3 of Figure 2, and Fig. 4 is a detailed view showing the scale beam graduations.

In said drawings the portions marked A represent the base, B the standard on which the beam is supported, C another standard carrying a slotted post *c* through which one end of the beam extends and vibrates, and D the beam, all of which parts are of a somewhat common type and require no special description. The beam D is mounted upon a knife-edge pivot 10 in a bearing block 11 mounted on the top post B. A scale is formed near one end of the beam as at point 12 for reading in percentages the variation in moisture content, and notches or marks are provided at the other end as at point 13, for positioning the balancing weight 20.

Two blocks 14 and 15 are mounted to slide on said beam, one having a pan 16 hung thereto and the other, as shown, a weight 17 hung thereto, but any means to make block 15 balance block 14 and pan 16 will be the equivalent of weight 17. The blocks 14 and 15 are shown as spaced equi-distant on each side of the pivot 10 and are duplicates as to weight, and weight 17 is made to exactly counterbalance the pan 16, but as above explained any means to obtain this counterbalance is all that is necessary as the common center of gravity of parts 15, and 14 and 16, does not move. Thus, the supporting means (14 and 16) for the material under examination is exactly counterbalanced in every operative position thereof by a primary balancing means (15 and 17).

A rod 18 with screw-threaded ends, the screw threads running in opposite directions, (on one end right-hand and on the other end left-hand) engages with screw-threaded perforations in said blocks 14 and 15 and at its center is provided with a knurled wheel or disk 19 which fits within a notch in the upper edge of the beam. The wheel being fast upon the rod and held from longitudinal movement by the notch the turning of said rod will operate through its reversely screw-threaded ends to move the blocks 14 and 15 toward or from each other in a uniform manner, or uniform distances at each turn of the rod.

In use the parts are adjusted as best shown in Figure 1 the blocks 14 and 15 with the pan 16 and weight 17 hung thereto respectively, being perfectly balanced. On the left-hand end of the beam provided with the scale (12) formed to read in percentages, one percent is represented by a distance equal to one-hundredth part of the distance from the knife-edge of the pivot 10 to the center of the block, or a point from which a line would pass through the center of gravity of said block and the pan 16 thereon when said block is in its initial position. The moisture content is determined on a percentage basis, the percent being based on oven dry weight as 100 percent. The test piece of lumber is placed upon the pan 16 and the weight (secondary balancing means) 20 adjusted on beam D until it exactly balances said test piece carried by the pan, said weight 20 then remains fixed in this position until the final test is made. Any loss in moisture content by further evaporation or drying will of course reduce the weight of the test piece and permit the beam to tilt sliding in the slot in post *c*. After the beam tilts the rod 18 is turned by means of the knurled disk 19 and this carries blocks 14 and 15 further from the balancing point or until block 14 carrying the test piece on the pan 16 has been moved sufficiently to again bring the beam into perfect balance. By means of the scale at point 12 on the beam the operator is enabled to determine the length of the movement and read in hundreds the exact moisture content removed and thus determine the percentage of moisture content which the lumber contained.

By this means a very efficient, simple and inexpensive and accurate device for this purpose is provided.

While as indicated in the drawing the scale graduations calibrated in percentage moisture content appear on the left side of the pivoted balance beam, it will be apparent to those skilled in the art that the scale graduations may be placed upon either side of the pivot inasmuch as for each movement of the scale pan 16, there is a corresponding equal movement of the weight 17 on the opposite side of the balance beam. Thus, the percentage moisture content may be indicated by the change in position on the balance beam of either the scale pan 16 or its balancing weight 17.

The primary object of the invention is the provision of an improved scale for automatically determining the moisture content of lumber and the like. By moisture content as used throughout this specification and the appended claims, I mean to include both water content and other volatile constituents customarily removed in the drying of materials such as lumber. It will be obvious to those skilled in the art that the scales of the invention are equally adapted for the determination of the moisture content or percentage loss or change in weight of other materials.

The determination of percentage moisture of lumber by the scales of the invention is based upon the oven-dry weight of the lumber and the calibrated scale graduations are uniform. The determination of the percentage moisture content of materials in many industries is based upon the original or green weight. The scales of the invention may, of course, be used for determining the moisture content of such materials by appropriately calibrating the scale graduations on the balance beam.

It will be understood that I do not wish to limit myself to the specific balance structure illustrated in the accompanying drawing. The scales illustrated in the drawing is given by way of example to illustrate the principle of the invention. I intend to include in the appended claims any scales embodying the principle of the invention as set forth therein and as described in this specification.

Having thus fully described my said invention, what I claim as new and desire to secure by Letters Patent, is:

1. A device for indicating in percentage the changes in weight of a material, comprising a balance beam pivoted at a point intermediate its ends, supporting means for the material under examination movable along said beam on one side of said pivot point, a primary balancing means and a secondary balancing means operatively associated with said beam on the opposite side of said pivot point, and means for simultaneously moving said supporting means and said primary balancing means away from or towards said pivot point but always in directions opposite to each other, said supporting means and said primary balancing means and said means for simultaneously moving the same being so constructed and proportioned that the common center of gravity of these means always remains the same for all operative positions thereof, said beam having a scale associated therewith and graduated to directly indicate in percentage the change in weight of the material under examination by the movement of said supporting means from an initial position in which the device is balanced by movement of said secondary balancing means to the position in which the device is again balanced by the simultaneous movement of the supporting means and the primary balancing means after the material has undergone a change in weight.

2. A device for indicating in percentage the change in weight of a material, comprising a pivoted balance beam, a movable supporting means for the material under examination operatively associated with said beam, a primary balancing means movably associated with said beam, means for effecting simultaneous movement of said supporting means and said primary balancing means, said supporting means and said primary balancing means and said means for simultaneously moving the same being so constructed and proportioned that the supporting means is exactly counterbalanced by said primary balancing means in all operative positions of the supporting means, and a secondary balancing means movably associated with said beam for balancing the device when said supporting means supports the material under examination, said beam having a scale associated therewith so graduated that the simultaneous movement of said supporting means and said primary balancing means necessary to again balance the device after the material under examination has changed in weight directly indicates the percentage change in weight of the material.

3. A device for indicating in percentage the change in moisture of a material, comprising a balance beam pivoted at a point intermediate its ends, supporting means for the material under examination movable along said beam on one side of said pivot point, a primary balancing means operatively associated with the beam on the opposite side of said pivot point, means for effecting simultaneous movement of said supporting means and said primary balancing means away from or towards said pivot point but always in directions opposite to each other, said supporting means and said primary balancing means and said means for simultaneously moving the same being so constructed and proportioned that said beam is balanced for all operative positions of said supporting means when not supporting the material, and a secondary balancing means operatively associated with the beam on said opposite side of the pivot point for balancing the device when the supporting means supports the material under examination, said beam having a percentage scale associated therewith in which one-hundredth part of the distance from said pivot point to the zero or initial position of said supporting means represents one per cent.

4. A device for determining the change in moisture content of a material, comprising a balance beam pivoted at a point intermediate its ends, supporting means for the material under examination and counterbalancing means therefor operatively associated with said beam on opposite sides respectively of the pivot point, an operating rod associated with said beam and adapted by turning to simultaneously move said supporting means and said counterbalancing means in opposite directions along the beam, and a counterbalancing weight movably associated with said beam for counterbalancing the material under examination when supported by said supporting means before any change in moisture content thereof takes place, said beam having a scale associated therewith and provided with graduations for indicating the percentage change in moisture content of the material under examination by the position on the beam of said supporting means when the beam is brought to a balanced position by turning said rod to simultaneously move the supporting means and the counterbalancing means along the beam after the material has undergone a change in moisture content.

5. A device for indicating in percentage the change in weight of a material, comprising a balance beam pivoted at a point intermediate its ends, supporting means for the material under examination movable along the beam on one side of said pivot point, a primary balancing means operatively associated with the beam on the opposite side of said pivot point, means for simultaneously moving said supporting means and said primary balancing means away from or towards said pivot point but always in directions opposite to each other, said supporting means and said primary balancing means and said means for simultaneously moving the same being so constructed and proportioned that the supporting means is exactly counterbalanced by said primary balancing means in all operative positions of the supporting means, and a secondary balancing means movably associated with said balance beam for initially balancing the device when said supporting means supports the material under examination, said beam having a scale associated therewith and graduated to directly indicate in percentage the change in weight of said material by the position on the beam of said supporting means when supporting the material after a change in weight thereof when the beam is brought to a balanced position by simultaneously moving the supporting means and the primary balancing means while the secondary balancing means remains in that position which initially effected a balance of the beam before the change in weight of the material under examination.

6. A device for indicating in percentage the change in moisture content of a material, comprising a balance beam pivoted at a point intermediate its ends, a rotatably mounted rod operatively associated with the beam and having right-hand and left-hand screw threads on the opposite ends respectively thereof, supporting means for the material under examination movable along the beam on one side of said pivot point, a primary counterbalancing means operatively associated with the beam on the opposite side of said pivot point, said supporting means and said primary counterbalancing means being operatively engaged by the screw threads of said rod whereby rotation of the rod moves the supporting means and the primary counterbalancing means in opposite directions, and a secondary counterbalancing means movably associated with the beam for balancing the device when said supporting means initally supports the material under examination, said beam having a scale associated therewith and graduated to directly indicate in percentage the change in moisture content of said material by the position on the beam of said supporting means when supporting the material after a change in moisture content thereof when the beam is brought to a balanced position by rotating said rod while the secondary balancing means remains in that position which initially effected a balance of the beam before the change in moisture content of the material under examination.

7. A device for indicating in percentage the change in moisture of a material, comprising a pivoted balance beam, a movable supporting means for the material under examination operatively associated with the beam, a primary balancing means movably associated with the beam, means for effecting simultaneous movement of said supporting means and said primary balancing means, said supporting means and said primary balancing means and said means for simultaneously moving the same being so constructed and proportioned that the supporting means is exactly counterbalanced by the primary balancing means in all operative positions thereof, a secondary balancing means movably associated with the beam for balancing the device when the material under examination is initially supported by the supporting means, said beam having a percentage scale associated therewith in which one-hundredth part of the distance from the pivot point of said beam to the zero or initial position of said supporting means represents one per cent.

In witness whereof, I have hereunto set my hand and seal at Chattanooga, Tennessee this 27th day of June, A. D. nineteen hundred and twenty-two.

JOHN McCALLIE DIVINE. [L. S.]

Witnesses:
 DAVID C. JOHNSON,
 JOHN A. FRANKLIN.